US010945164B2

(12) United States Patent
Wallentin et al.

(10) Patent No.: US 10,945,164 B2
(45) Date of Patent: Mar. 9, 2021

(54) METHOD IN A BASE STATION OF A COMMUNICATION SYSTEM FOR MAKING A HANDOVER DECISION, BASE STATION, COMPUTER PROGRAMS, AND COMPUTER PROGRAM PRODUCTS

(75) Inventors: Pontus Wallentin, Linköping (SE); Erik Eriksson, Linköping (SE); Pål Frenger, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 684 days.

(21) Appl. No.: 14/130,820

(22) PCT Filed: Jul. 7, 2011

(86) PCT No.: PCT/SE2011/050923
§ 371 (c)(1),
(2), (4) Date: Jan. 3, 2014

(87) PCT Pub. No.: WO2013/006105
PCT Pub. Date: Jan. 10, 2013

(65) Prior Publication Data
US 2014/0146788 A1 May 29, 2014

(51) Int. Cl.
*H04W 36/00* (2009.01)
*H04W 36/32* (2009.01)
(52) U.S. Cl.
CPC .... *H04W 36/0011* (2013.01); *H04W 36/0085* (2018.08); *H04W 36/0088* (2013.01); *H04W 36/32* (2013.01); *H04W 36/00837* (2018.08)

(58) Field of Classification Search
CPC ..... H04W 72/04; H04W 88/08; H04W 76/00; H04W 4/06; H04W 72/0446; H04W 72/0453; H04W 80/04; H04W 84/12; H04W 88/06; H04W 84/18; H04W 36/00; H04W 36/32; H04W 36/0083;
(Continued)

(56) References Cited

U.S. PATENT DOCUMENTS 6,615,044 B2 * 9/2003 Tigerstedt ......... H04W 36/0088
370/331
8,891,458 B2 * 11/2014 Tenny ................... H04W 76/04
370/328
(Continued)

FOREIGN PATENT DOCUMENTS

CN 102149123 A 8/2011
EP 1954091 A2 8/2008
(Continued)

*Primary Examiner* — Hardikkumar D Patel
(74) *Attorney, Agent, or Firm* — Murphy, Bilak & Homiller, PLLC

(57) ABSTRACT

The invention relates to a method (20) in a base station (2, 3) of a communication system (1) for making a handover decision, the communication system 1 comprising a user equipment (4, 5). The method (20) comprises the steps of: performing (21) a first type of mobility mechanism for the user equipment (4, 5), and upon the first type of mobility mechanism fulfilling a criterion: configuring (22) a second type of mobility mechanism for the user equipment 4, 5, and making (23) a handover decision for the user equipment (4, 5) based on the second type of mobility mechanism. The invention also relates to a base station, computer programs and computer program products.

22 Claims, 7 Drawing Sheets

(58) Field of Classification Search
CPC ......... H04W 36/0088; H04W 36/0011; H04W 36/14; H04W 36/30; H04W 36/34; H04W 36/0055; H04W 84/045; H04Q 7/20; H04B 17/382; H04B 17/318
See application file for complete search history.

(56) References Cited

U.S. PATENT DOCUMENTS

| | | |
|---|---|---|
| 2003/0114193 A1 | 6/2003 | Kavak et al. |
| 2004/0185853 A1* | 9/2004 | Kim ................... H04W 36/0083 455/438 |
| 2007/0032237 A1* | 2/2007 | Chang ................. H04B 17/382 455/436 |
| 2009/0111381 A1* | 4/2009 | Johnson ............... H04B 7/0408 455/63.4 |
| 2009/0163216 A1* | 6/2009 | Hoang .............. H04W 36/0055 455/450 |
| 2010/0029278 A1* | 2/2010 | Fang ................ H04W 36/0055 455/436 |
| 2010/0177725 A1 | 7/2010 | van Rensburg |
| 2014/0080488 A1 | 3/2014 | Michel et al. |
| 2014/0094164 A1 | 4/2014 | Hwang et al. |
| 2015/0257073 A1 | 9/2015 | Park et al. |

FOREIGN PATENT DOCUMENTS

| | | |
|---|---|---|
| WO | 0051389 A1 | 8/2000 |
| WO | 2011002374 A1 | 1/2011 |
| WO | 2014030065 A2 | 2/2014 |
| WO | 2014032271 A1 | 3/2014 |

* cited by examiner

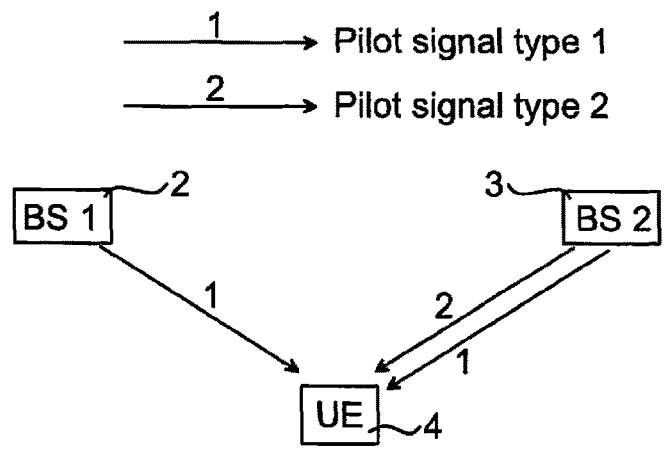
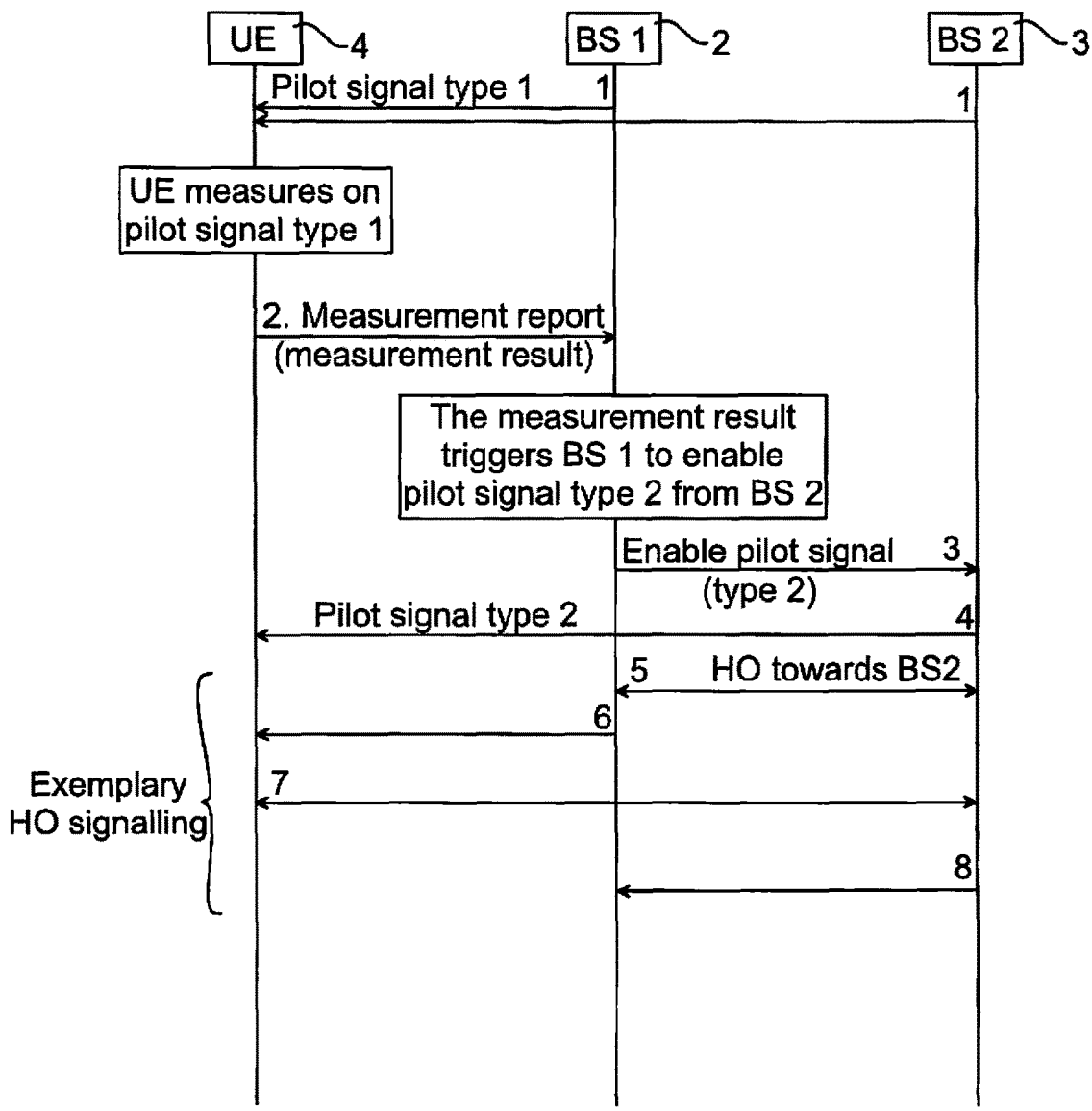
Fig. 4
Fig. 5A

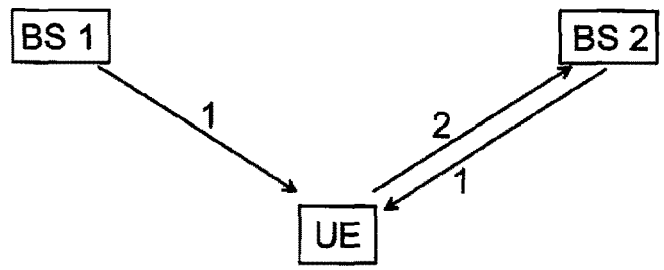
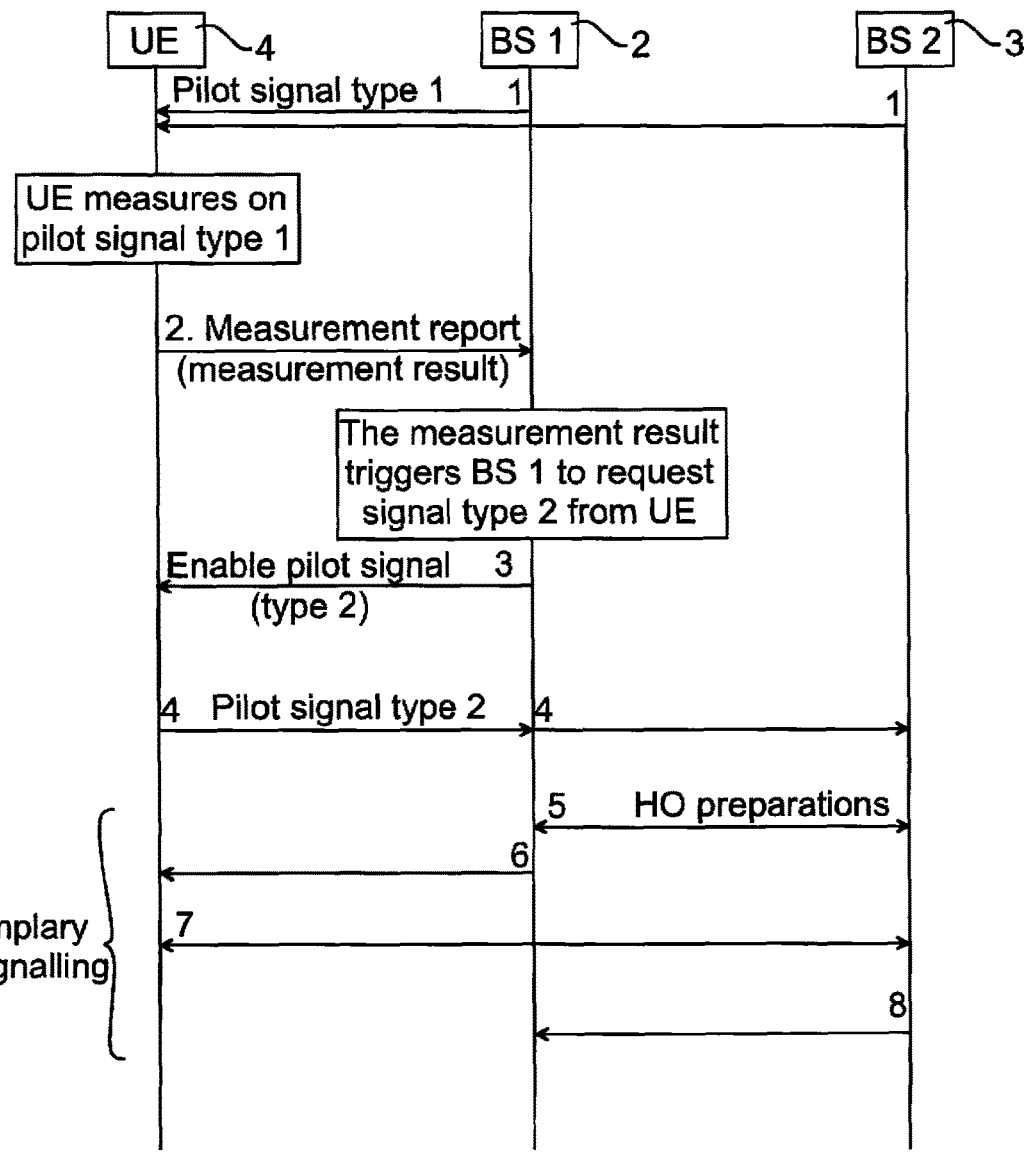
Fig. 6
Fig. 7A

METHOD IN A BASE STATION OF A COMMUNICATION SYSTEM FOR MAKING A HANDOVER DECISION, BASE STATION, COMPUTER PROGRAMS, AND COMPUTER PROGRAM PRODUCTS

FIELD OF THE INVENTION

The invention relates generally to the field of handover, and in particular to handover related signaling.

BACKGROUND OF THE INVENTION

Handover measurements are performed in a similar way in all present cellular radio communication systems. A user equipment measures on downlink pilot signals transmitted by neighboring base stations, and compares with a downlink pilot signal received from the serving base station that the user equipment is currently connected to. Quantities measured are typically different means of signal strength (e.g. Reference Signal Received Power, RSRP) and signal quality (e.g. Reference Signal Received Quality, RSRQ).

An instruction with a list of neighboring base stations for the user equipment to measure on may be sent from the cellular radio communication system and is typically based on the current location (cell) of the user equipment. The user equipment may alternatively by itself find the downlink pilot signals sent by neighboring base stations, in a similar way as during cell selection, by scanning frequencies.

The base station does not know whether there is a user equipment located in a neighboring cell, which performs a handover measurement on this particular base station. The base station therefore must continuously transmit all different kinds of downlink pilot signals needed for user equipment measurements within the cell covered by the base station. This is a waste of energy since typically a user equipment in a given location and direction is measuring the downlink pilot signal only parts of the time.

A cell in the radio communication system is traditionally defined as the coverage area of the system broadcast channel. In all 3GPP systems that have been designed so far (GSM, HSPA, LTE) the coverage area of the data channels is identical to the coverage area of the broadcast channel. However, as the performance of current radio communication systems is improved, including novel features such as coordinated multi-point (CoMP), multi-carrier, and multi-hop support this coupling between system information and data coverage becomes increasingly unmotivated.

Further, with beam-forming, MIMO (Multiple-input, multiple output), multi-carrier, CoMP, multi-radio access technologies, and reconfigurable antenna systems the cell concept becomes unclear and the traditional interpretation of the cell concept is being questioned. It is more fruitful to view the cell as being dynamic that may be specifically adjusted for a single user equipment or a specific group of user equipments, rather than being a static area common for all user equipment within a given area. By leaving the idea that the coverage of the system information broadcast channel and the data channels needs to be identical a much more efficient system operation may be implemented.

The above is illustrated in FIG. 1, showing system operation enabled by allowing separate coverage of system broadcast channels (BCH) and packet data transmissions. In the exemplifying scenario all user equipment (UE) receive the same system information from a BCH within a "broadcast channel area", being the coverage area of the broadcast channel. A first user equipment UE1 is configured to receive data from a MIMO capable cell provided by a first radio base station RBS1. A second user equipment UE2 communicates with a CoMP cell corresponding to signals from the first radio base station RBS1, a second radio base station RBS2, and a third radio base station RBS3. A third user equipment UE3 is in communication with a cell with an omni-directional antenna pattern provided by a fourth radio base station RBS4.

The decision to set up a CoMP cell for the second user equipment UE2, and a MIMO cell for the first user equipment UE1 can then take into account the amount of traffic that the second and first user equipment UE2, UE1 want to communicate.

However, current mobility solutions are not designed for radio communication systems wherein the cells may be dynamically re-configured. If considering the cells to be dynamic and user equipment specific, mobility issues will arise. For example, in case a user equipment bases the mobility decision on a downlink reference signal from a non-serving candidate cell then it is only possible for the user equipment to measure on a common downlink beam (i.e. that is not specifically targeting that particular user equipment). In case the non-serving candidate cell is capable of beam-forming a data transmission towards the particular user equipment, then it is not possible for the user equipment to in advance determine the quality of the signal after handover, as the use of the multiple antenna elements (enabling the beam-forming) of the candidate cell cannot be predicted by the user equipment.

SUMMARY OF THE INVENTION

An object of the invention is to improve handover, particularly in view of having dynamically reconfigurable cells.

The object is according to a first aspect of the invention achieved by a method in a base station of a communication system for making a handover decision, the radio communication system comprising a user equipment. The method comprises the steps of:

performing a first type of mobility mechanism for the user equipment, and upon the first type of mobility mechanism fulfilling a criterion:

configuring a second type of mobility mechanism for the user equipment, and making a handover decision for the user equipment based on the second type of mobility mechanism.

As compared to prior art, wherein the base station must continuously transmit downlink pilot signals, needed for user equipment measurements (as it does not know whether there is a user equipment, located in a neighboring cell, which performs a handover measurement on this particular base station), the invention enables a reduction in amount of downlink pilot signals. In particular, the second type of mobility mechanism is not performed continuously, but rather upon need. The invention thus alleviates the waste of energy brought about in the prior art situation, i.e. having the base station continuously transmitting all downlink pilot signals, which is mostly unneeded since typically a user equipment at a given location and direction is measuring the downlink pilot signal only parts of the time.

The object is according to a second aspect of the invention achieved by a base station of a radio communication system comprising a user equipment. The base station comprises a controller arranged to:

perform a first type of mobility mechanism for the user equipment, and upon the first type of mobility mechanism fulfilling a criterion:

configure a second type of mobility mechanism for the user equipment, and make a handover decision based on the second type of mobility mechanism.

The object is according to a third aspect of the invention achieved by a computer program for a base station of a communication system comprising a user equipment. The computer program comprises computer program code, which, when run on the base station, causes the base station to perform the steps of:

performing a first type of mobility mechanism for the user equipment, and upon the first type of mobility mechanism fulfilling a criterion:

configuring a second type of mobility mechanism for the user equipment, and making a handover decision based on the second type of mobility mechanism.

The object is according to a fourth aspect of the invention achieved by a computer program product comprising a computer program as above, and a computer readable means on which the computer program is stored.

Further features and advantages of the invention will become clear upon reading the following description and the accompanying drawings.

BRIEF DESCRIPTION OF THE DRAWINGS

FIG. 4 illustrates schematically pilot signaling of a first embodiment of the invention.

FIG. 5A is a sequence diagram illustrating exemplary signaling between nodes of a communication system for the embodiment of FIG. 4.

FIG. 6 illustrates schematically pilot signaling of a second embodiment of the invention.

FIG. 7A is a sequence diagram illustrating exemplary signaling between nodes of a communication system for the embodiment of FIG. 6.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
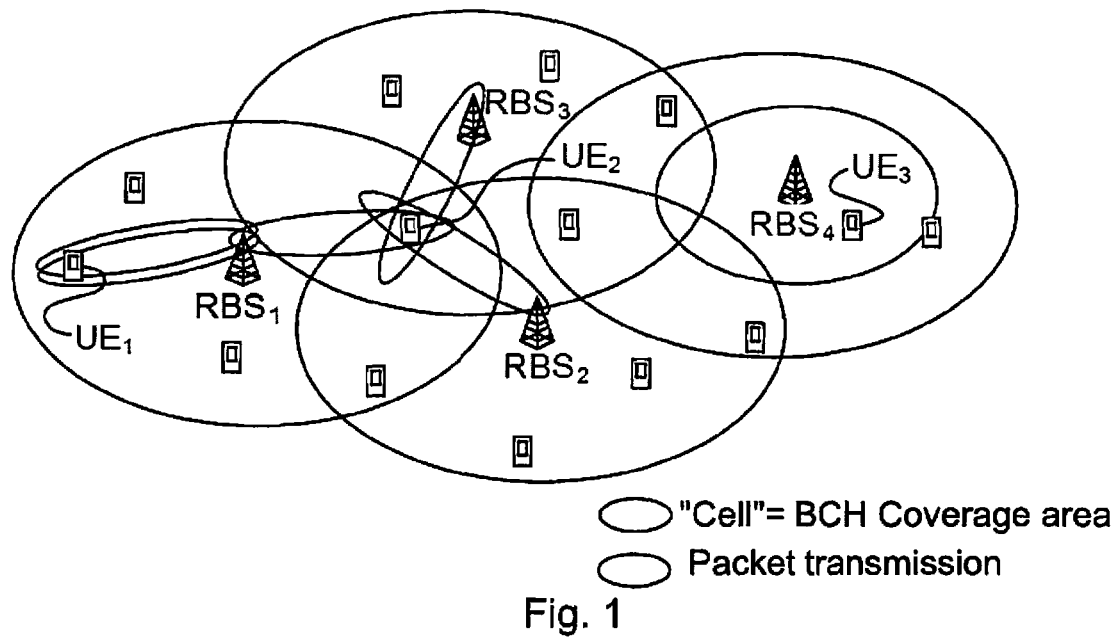
FIG. 1 illustrates a possible scenario for dynamic cell re-configuration.
Figure 2:
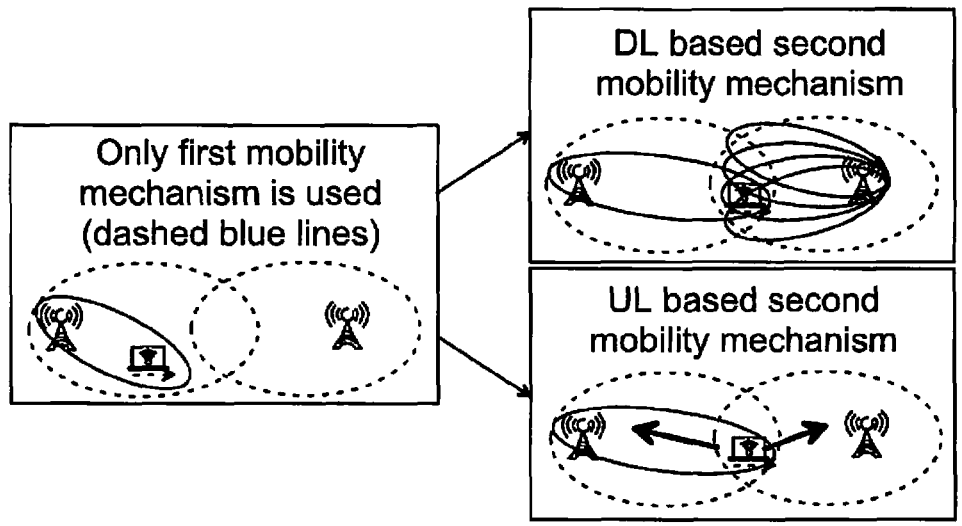
FIG. 2 illustrates a basic concept of aspects of the invention.

Briefly, a basic concept of the present invention is illustrated in FIG. 2. A user equipment moving towards a target candidate base station uses for example a conventional mobility mechanism. At some time, for example when the user equipment comes sufficiently close to the target candidate base station, a second mobility mechanism is triggered. Stated differently: Use first mobility mechanism (e.g. the user equipment searches for pilots and reports when RSRP>threshold; or user equipment geographical location is determined to be in vicinity of cell border) in order to trigger activation of a second mobility mechanism (e.g. activate transmission of reference signals and target cell measurements for uplink reference signal-based handover, "UL RS Based HO"; or configure target cell transmission of downlink (DL) mobility reference signals (RS) and request user equipment to perform corresponding measurements on these).

Figure 3:
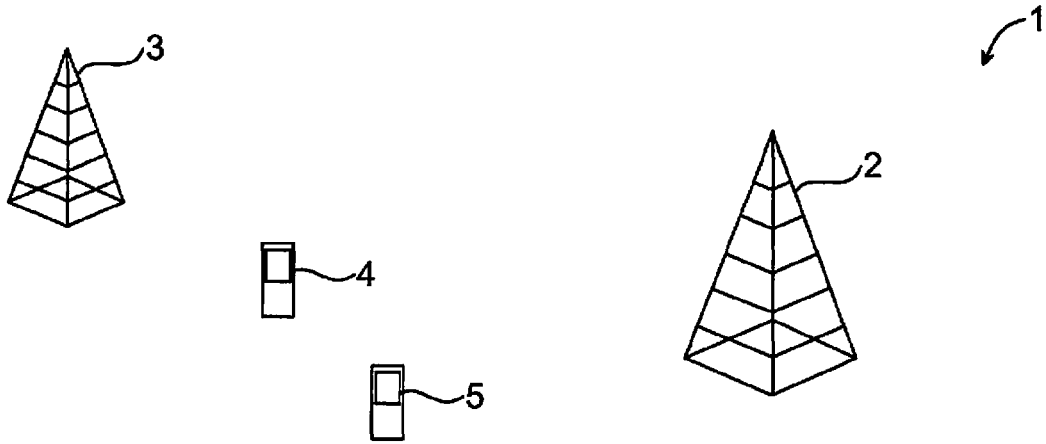
FIG. 3 illustrates schematically an environment in which embodiments of the invention may be implemented.

FIG. 3 illustrates a radio communication system in which aspects of the invention may be implemented. In particular, a communication system 1 comprises a first base station 2 and a second base station 3 and a number of user equipment 4, 5. The communication system 1 may be a LTE conforming system, the base stations 2, 3 then being e node Bs.

FIG. 4 illustrates schematically pilot signaling of a first embodiment of the invention. The first base station 2 is the base station currently serving the user equipment 4, and the second base station 3 is a possible candidate or target base station. The first base station 2 and the second base station 3 both transmit a first type of pilot signal (indicated in the figure by arrows denoted 1) used for mobility purposes. The user equipment 4 receives these pilot signals, makes measurements on them and reports the measurements to the first base station 2. Based on the downlink pilot signal measurements performed by the user equipment 4 and reported e.g. to the first base station 2, a second type of pilot signal is transmitted by the second base station 3.

FIG. 5A is a sequence diagram illustrating exemplary signaling between nodes of the communication system 1 for the embodiment of FIG. 4. This embodiment can be seen as a downlink based second mobility mechanism (refer also to FIG. 2).

The first base station 2 and the second base station 3 transmit the first type of pilot signal (arrows denoted with 1). The user equipment 4 measures these pilot signals of first type and transmits a measurement report (arrow denoted 2) or measurement result to its serving base station, i.e. the first base station 2. The measurement result triggers the first base station 2 to enable (arrow denoted 3) a second type of pilot signal to be transmitted from the second base station 3 (the target base station). This can be accomplished for example by the first base station 2 communicating to the second base station 3 the need for the second type of pilot signal (e.g. over X2 interface in LTE). Thereafter, the second base station 3 starts transmitting the second type of pilot signal (arrow denoted 4).

Subsequently, based on the second type of pilot signal a handover is to be made. That is, conventional handover signaling is performed for handing the user equipment 4 over from the first base station 2 to the second base station 3. In an exemplary handover signaling, the first base station 2 and the second base station 3 exchange handover preparation signaling (arrow denoted 5). The first base station 2 transmits a connection reconfiguration message to the user equipment 4 (arrow denoted 6). There is then typically further signaling between the user equipment 4 and the second base station 3 for performing the handover, the signaling comprising e.g. synchronization of the user equipment 4 to the second base station 4 (arrow 7). When the user equipment 4 has been handed over to the second base station 3, a user equipment context release message (for LTE), or similar, is transmitted from the second base station 3 to the first base station 2 (arrow denoted 8).

Figure 5B:
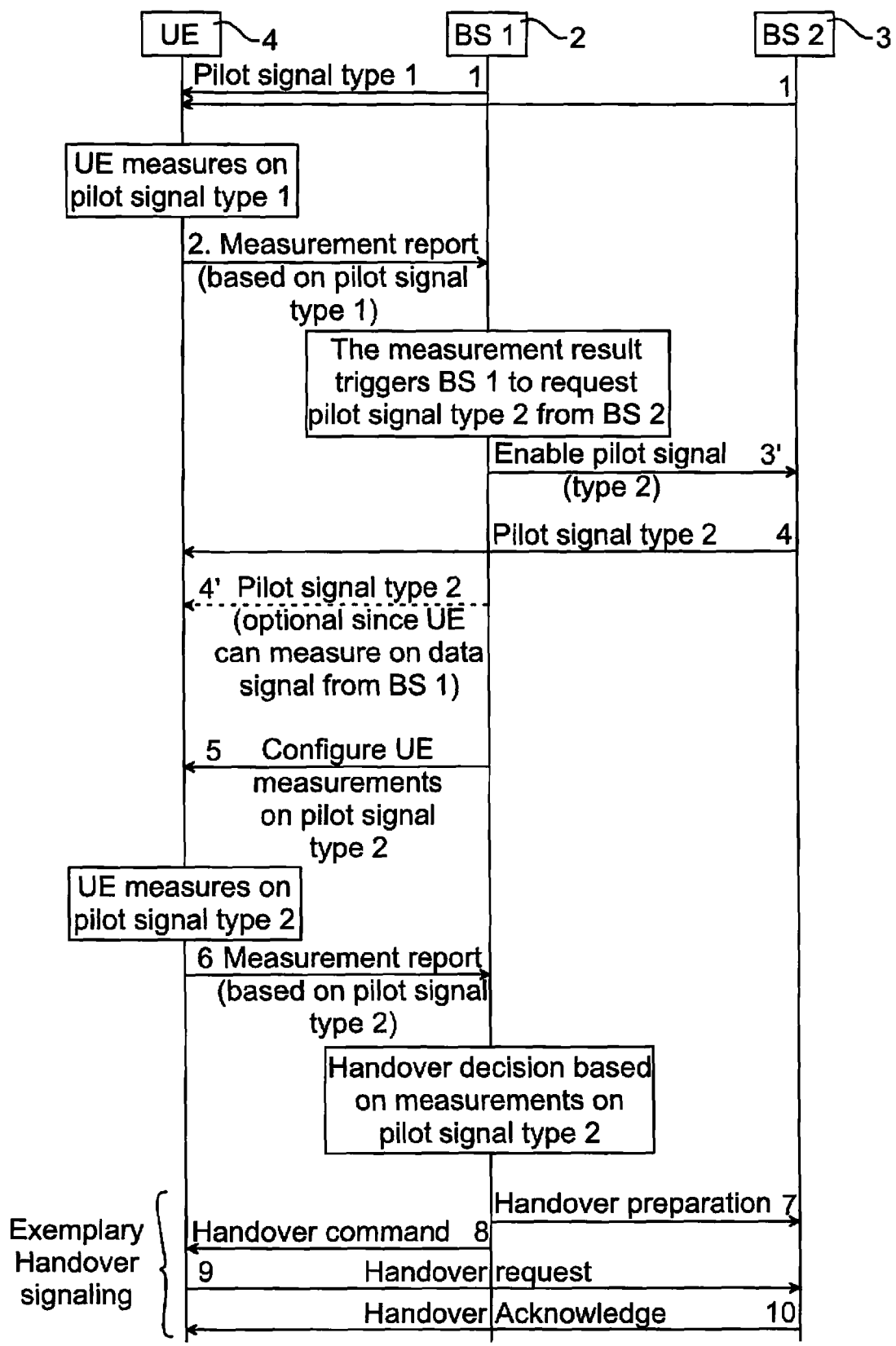
FIG. 5B illustrates the scenario of FIG. 5A in more detail.

FIG. 5B illustrates the scenario of FIG. 5A in more detail. In particular, the enablement of a pilot signal of the second type (arrow 3 of FIG. 5A) may comprise a request (arrow 3' of FIG. 5B) from the first base station 2 to the second base station 3. Further, it is noted that the second type of pilot signal transmitted by the second base station 3 may be transmitted also by the first base station 2 (arrow 4' of FIG. 5B), but this is optional, since the user equipment 4 is able to measure on data signal from the second base station 3. The first base station 2 then transmits a configuration message to the user equipment 4 on the second type of pilot signal (arrow 5 of FIG. 5B), upon which the user equipment 4 measures on the second type of pilot signal. The user equipment 4 then transmits a measurement report (arrow 6) based on the second type of pilot signal to the first base station 2. The first base station 2 then makes a handover decision based on measurements on the second type of pilot signal. If a handover is to be performed, a handover is made. It is noted that the specific details of the handover procedure is not important for the invention, and FIG. 5B illustrates an exemplary handover signaling. In particular, the first base station 2 transmits a handover preparation message (arrow 7) to the second base station 3, followed by a handover command (arrow 8) transmitted to the user equipment 4. The user equipment 4 having received the handover command from the first base station 2, transmits a handover request (arrow 9) to the second base station 3 (i.e. target base station), whereupon the second base station 3 transmits a handover acknowledgement (arrow 10) to the user equipment 4.

FIG. 6 illustrates schematically pilot signaling of a second embodiment of the invention. The first base station 2 is again the base station currently serving the user equipment 4, and the second base station 3 is the target base station. The first base station 2 and the second base station 3 both transmit a first type of pilot signal (indicated in the figure by arrows denoted 1) used for mobility purposes. The user equipment 4 receives these pilot signals and makes measurements on them and reports the measurements to the first base station 2. Based on this measurement, the first base station 2 requests a second type of pilot signal from the user equipment 4.

FIG. 7A is a sequence diagram illustrating exemplary signaling between nodes of a communication system for the embodiment of FIG. 6. This embodiment can be seen as an uplink based second mobility mechanism (refer also to FIG. 2).

The first base station 2 and the second base station 3 transmit the first type of pilot signal (arrows denoted with 1). The user equipment 4 measures these pilot signals of first type and transmits a measurement report (arrow denoted 2) or measurement result to its serving base station, i.e. the first base station 2. The measurement results triggers the first base station 2 to request a second type of pilot signal to be transmitted from the user equipment 4 (arrow 3). Thereafter, the user equipment 4 starts transmitting the second type of pilot signal (arrow denoted 4), which is received by the first base station 2 and the second base station 3.

Arrows denoted 5-8 correspond to arrows denoted 5-8 of FIG. 5A, i.e. exemplary handover signaling and will not be described further.

In a variation of the above embodiment, the enabling of the second type of pilot signal may instead comprise the first base station 2 requesting the second base station 3 to measure on a signal (already) transmitted by the user equipment 4.

Figure 7B:
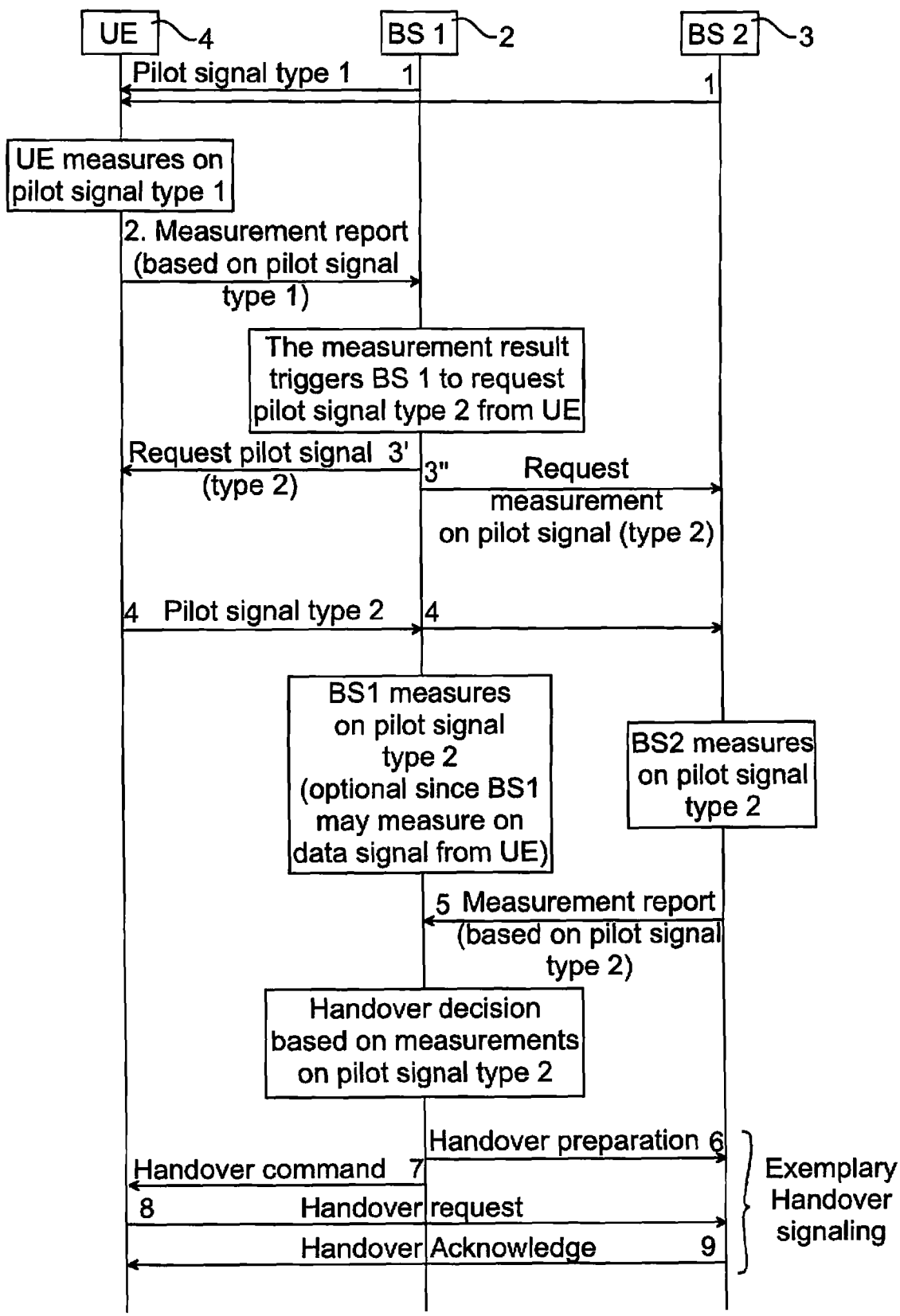
FIG. 7B illustrates the scenario of FIG. 7A in more detail.

FIG. 7B illustrates the scenario of FIG. 7A in more detail. In particular, the enablement of a pilot signal of the second type (arrow 3 of FIG. 7A) may comprise a request (arrow 3' of FIG. 7B) from the first base station 2 to the user equipment 4 or a request (arrow 3" of FIG. 7B) from the first base station 2 to the second base station 3. The user equipment 4 then starts transmitting the second type of pilot signal (arrow denoted 4), which is received by the first base station 2 and the second base station 3. The second base station 3 then measures on the second type of pilot signal. It is noted that also the first base station 2 may measure on the second type of pilot signal, but this is optional. The second base station 3 then transmits a measurement report (arrow 5) based on the second type of pilot signal to the first base station 2, which then makes a handover decision based on measurements on the second type of pilot signal.

Arrows denoted 6-9 of FIG. 7B correspond to arrows denoted 7-10 of FIG. 5B, i.e. exemplary handover signaling and will not be described further.

The pilot signals (pilot signal type 1 and pilot signal type 2) may comprise any measurable radio signal. For example, in LTE conforming systems, the pilot signal of the first type could comprise cell specific reference signal (CRS), positioning reference symbols, primary and/or secondary synchronization signals, sounding (uplink), Physical Uplink Shared Channel demodulation reference signal (PUSCH DM-RS) (uplink). The pilot signal of the second type could comprise CRS, channel state information reference signals (CSI-RS), sounding reference signals (uplink), PUSCH DM-RS (uplink). It is noted that the preceding signals are given purely as examples, and that other existing or future pilot signals could be used.

It is noted that the invention is not restricted to two base stations or signaling from two locations. The first base station 2 and/or the second base station 3 may control distributed antennas having a respective coverage area or a third (or yet additional) base station(s) may be involved. In an embodiment, the second base station 3 may transmit a pilot signal of the first type, which the user equipment 4, 5 measures on. The user equipment 4, 5 sends a report on its measurements on this pilot signal to its serving base station, i.e. base station 2. This report in turn may activate or trigger the pilot signal of the second type to be sent from yet another base station (a third base station, not illustrated in the figures). That is, the first base station 2 requests such third base station to start transmitting the pilot signal of the second type. Alternatively, the report from the user equipment 4, 5 may, in case of e.g. distributed antennas, trigger a pilot signal of the second type to be sent from another antenna (at another location) controlled by e.g. the second base station 3.

Figure 8:
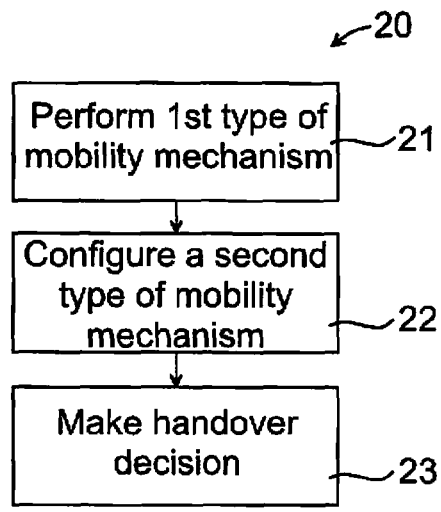
FIG. 8 illustrates a flow chart over steps of a method in a base station.

FIG. 8 illustrates a flow chart over steps of a method in a base station in its most general embodiment. In this embodiment of an aspect of the invention, a method 20 in the base station 2, 3 is provided, for making a handover decision. The method 20 comprises the first step of performing 21 a first type of mobility mechanism for the user equipment 4, 5. Upon this first type of mobility mechanism fulfilling a criterion, the method 20 comprises the steps of:

configuring 22 a second type of mobility mechanism for the user equipment 4, 5, and making 23 a handover decision for the user equipment 4, 5 based on the second type of mobility mechanism.

Figure 9:
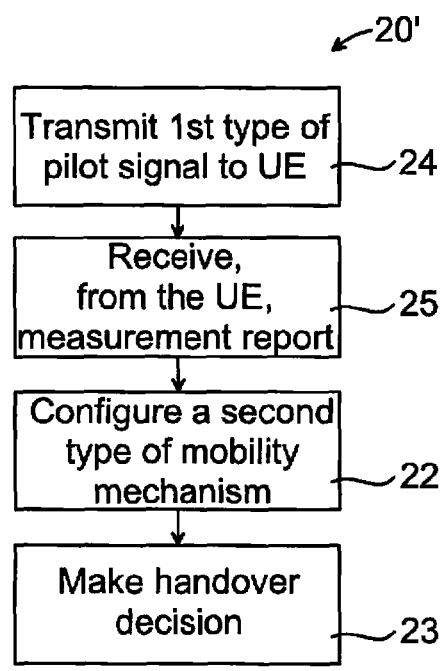
FIG. 9 illustrates a flow chart over steps of a method in a base station.

FIG. 9 illustrates a flow chart over steps of a method 20' in a base station. 2. In this method 20', the step of performing a first type of mobility mechanism, as in the method 20 described in relation to FIG. 8, comprises the sub-steps of:

transmitting 24 a first type of pilot signal to the user equipment 4, 5, and receiving 25 from the user equipment 4, 5 a measurement report in response to transmitting the first type of pilot signal.

As an example on this: the base station 2, 3 transmits the first type of pilot signal, e.g. downlink reference signals. The user equipment 4, 5 receives these signals and returns a measurement report to the base station 2, 3 based thereon.

In an embodiment, the measurement results of the measurement report are then compared with threshold values. Thereby it can be checked whether the first type of mobility mechanism fulfills the set criterion. For example, if the measurement result of the measurement report indicates reference signal received power being above a threshold value (RSRP>threshold), it can be determined that the first mobility mechanism is fulfilled (the user equipment 4, 5 being a candidate for performing a handover).

In an embodiment, the step of configuring 22 comprises activating a second type of pilot signal is based on the measurement report. The step of activating the second type of pilot signal may comprise requesting from the user equipment 4, 5 the second type of pilot signal. The second type of pilot signal may thus comprise an uplink pilot signal.

Alternatively, the step of activating a second type of pilot signal may comprise requesting the target base station 3 to signal the second type of pilot signal to the user equipment 4, 5. The second type of pilot signal may thus alternatively comprise a downlink pilot signal.

In an embodiment, the first type of pilot signal comprises a downlink pilot signal and the measurement report comprises a downlink pilot signal strength measurement or a downlink pilot signal quality measurement.

In different embodiments, the step of configuring 22 comprises activating or deactivating a downlink pilot signal transmitted by the base station 2, 3 to the user equipment 4, 5, and/or changing beam-forming configuration of a downlink pilot signal transmitted by the base station 2, 3 to the user equipment 4, 5, and/or activating, deactivating or reconfiguring an uplink pilot signal measurement received from the user equipment 4, 5.

In an embodiment, the step of performing the first type of mobility mechanism comprises determining positioning information for the user equipment 4, 5. A user equipment 4, 5 being located between the two base stations 2, 3 may need to perform a handover (which handover is then performed based on the second mobility mechanism). The determination of positioning information can be performed in any conventional manner, e.g. by using signal measurements and make a position estimate (and optional velocity computation) based on the measurements. The signal measurements may be made by the user equipment 4, 5 or by the base station 2, 3.

In the above embodiment, the first type of mobility mechanism fulfills the criterion when the geographical location of the user equipment 4, 5 is determined to be within a predetermined distance from a cell border of the base station 2, 3.

In an embodiment, the method 20, 20' is performed for user equipment 4, 5 having an amount of uplink data above a first threshold, and/or having an amount of downlink data above a second threshold, and/or having a predetermined quality of service and/or moving below a predetermined speed. That is, only certain user equipment are eligible for the two-step mobility method.

Figure 10:
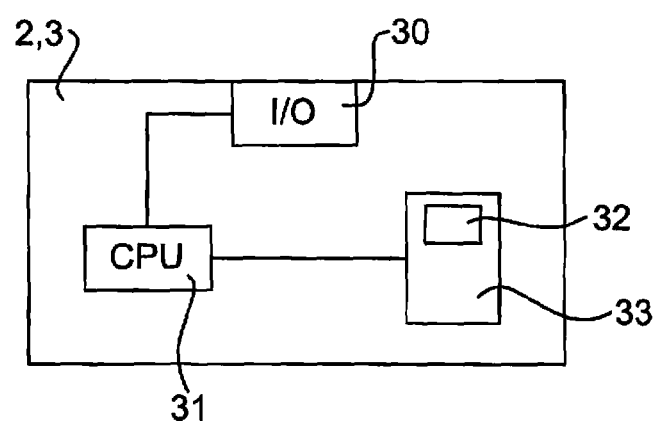
FIG. 10 illustrates a base station of an aspect of the invention.

FIG. 10 illustrates the base station 2, 3 and in particular means for implementing the described methods. The base station 2, 3 comprises a processor 31, e.g. a central processing unit, microcontroller, digital signal processor (DSP), etc., capable of executing software instructions stored in a computer program product 33 e.g. in the form of a memory. The processor 31 is connected to an input/output device 30 that receives inputs from user equipment 4, 5, typically via some other device, e.g. a transceivers, of the base station 2, 3. It is noted that although only one processor 31 is illustrated in FIG. 10, the implementation may comprise distributed hardware so that several CPUs are used rather than one when running the software.

The described methods and algorithms or parts thereof for use in handling and/or preparing for handover may be implemented e.g. by software and/or application specific integrated circuits in the processor 31. To this end, the base station 2, 3 may further comprise a computer program 32 stored on a computer program product 33.

With reference still to FIG. 10, the invention also encompasses such computer program 32. The computer program 32 comprises computer program code which when run on the base station 2, 3, and in particular the processor 31 thereof, causes the base station 2, 3 to perform the methods as described.

A computer program product 33 is also provided comprising the computer program 32 and computer readable means on which the computer program 32 is stored. The computer program product 33 can be any combination of read and write memory (RAM) or read only memory (ROM). The computer program product 33 may also comprise persistent storage, which, for example can be any single one or combination of magnetic memory, optical memory, or solid state memory.

From the above, it is clear that each base station 2, 3 is capable of transmitting a number of different kinds of downlink pilot signals, used for different purposes. Some of these are used for measurements, e.g. one downlink pilot signal is needed for signal strength measurement and another downlink pilot signal is needed for signal quality measurement. Moreover, some of these downlink pilot signals can be beam-formed, i.e. concentrated in a given direction, e.g. to a particular user equipment. The use of beam-forming depends e.g. on the capabilities of the particular base station 2, 3.

Instead of always transmitting all kinds of downlink pilot signals from every base station 2, 3 of the communication system 1, as is done in prior art, the invention makes use of the realization that it is more efficient to transmit those signals on a need basis. Thus, at any given time, the base station 2, 3 transmits none, a few, or all of these pilot signals.

The described methods can thus also be seen as methods for selecting which pilot signal(s) that should be transmitted from each base station 2, 3. The selection can be done by: using downlink pilot signals measurements performed by user equipment 2 and reported to the base station 3 controlling the serving cell of the user equipment 4, 5 (or to a different base station 3); using uplink measurements performed by the base station 2 controlling the serving cell of the user equipment 4, 5 (or a different base station 3); using positioning information, i.e. the geographical location(s) of the user equipment 4, 5, available using known positioning methods.

By using one of, or a combination of, the selection strategies above, the base station 2, 3 may turn on, turn of, and/or reconfigure beam-forming of, a particular downlink pilot signal used by a user equipment 4, 5 for performing downlink measurements.

The above can be summarized by (A) There exists a set of measurement mechanisms:

A1. Measurement of a certain type of downlink pilot signal (performed by the user equipment 4, 5).

A2. Measurement of a certain type of uplink pilot signal (performed by the base station 2, 3).

A3. Positioning measurement, e.g. based on the LTE Positioning Protocol (LPP)

(B) The base station 2, 3 uses a first measurement mechanism in the set (A1, A2, A3) to reconfigure a second measurement mechanism in the set (A1, A2, A3). For example:

B1 Comparing the result of the first measurement mechanism with a threshold (performed by the user equipment 4, 5).

B2 Comparing the result of the first measurement mechanism with a threshold (performed by the base station 2, 3).

B3 Determining the positioning of the user equipment 4, 5

Examples of reconfiguration of the second measurement mechanism may be:

1. Switch on or switch off a certain type of downlink pilot signal transmitted by the base station (or a different base station)

2. Change the beam-forming configuration (e.g. direction) of a certain type of downlink pilot signal transmitted by the base station (or a different base station)

3. Switch on, switch off, or reconfigure the downlink measurement performed by the user equipment 4, 5 on a set of downlink pilot signals 4. Switch on or switch off a certain uplink pilot signal transmitted by the user equipment 4, 5

5. Switch on, switch off, or reconfigure uplink pilot signal measurements performed by the base station 2 (or a different base station 3)

Since the base station 2, 3 only transmits downlink pilot signals on a need basis, energy will be saved, especially during periods of low traffic when no user equipment performs measurements towards the base station.

Using the selection mechanism, the network will use the downlink pilot signal that serves the current user equipment 4, 5 best in terms of performing measurements towards this base station 2, 3. The measurement results will have better quality and more precise handover can be made, leading to less power transmitted, more capacity and/or higher user bitrate.

The invention claimed is:

1. A method performed by a first node in a communication system, the method comprising:
receiving first measurement information from a User Equipment (UE) being served via a first transceiver in the communication system, the first measurement information indicating measurements made by the UE on a first broadcast signal transmitted by the first transceiver and on a second broadcast signal transmitted by a neighboring, second transceiver in the communication system;
initiating transmission of a directional signal between the UE and the second transceiver, responsive at least to determining from the first measurement information that the second transceiver is a candidate for serving the UE;
receiving second measurement information from the UE or the second transceiver, the second measurement information indicating measurements made on the directional signal; and
controlling handover of the UE from the first transceiver to the second transceiver in dependence on the second measurement information.

2. The method of claim 1, wherein the first node is a base station that includes or otherwise controls at least the first transceiver.

3. The method of claim 1, wherein the first node comprises a first base station that includes the first transceiver, and wherein the second transceiver is included in a second base station neighboring the first base station.

4. The method of claim 1, wherein initiating transmission of the directional signal between the UE and the second transceiver comprises initiating transmission of a beam-formed reference signal between the UE and the second transceiver.

5. The method of claim 4, wherein initiating transmission of the beamformed reference signal comprises initiating transmission of the beamformed reference signal by the second transceiver to the UE, and wherein receiving the second measurement information comprises receiving the second measurement information from the UE.

6. The method of claim 5, further comprising transmitting configuration information to the UE, for use by the UE in configuring measurements on the beamformed reference signal.

7. The method of claim 4, wherein initiating transmission of the beamformed reference signal comprises initiating transmission of the beamformed reference signal by the UE to the second transceiver, and wherein receiving the second measurement information comprises receiving the second measurement information from the second transceiver.

8. The method of claim 1, wherein determining from the first measurement information that the second transceiver is a candidate for serving the UE comprises determining that a signal quality or strength of the second broadcast signal at the UE meets a defined threshold.

9. The method of claim 1, wherein the first broadcast signal and the second broadcast signal respectively cover a first broadcast coverage area and a second broadcast coverage area, and the directional signal covers a directional coverage area different than the second broadcast coverage area.

10. The method of claim 1, wherein the first broadcast signal and the second broadcast signal are a first common pilot signal transmitted by the first transceiver and a second common pilot signal transmitted by the second transceiver, respectively.

11. The method of claim 1, wherein initiating transmission of the directional signal between the UE and the second transceiver comprises initiating the transmission responsive to determining from the first measurement information that the second transceiver is a candidate for serving the UE, in conjunction with determining that there is more than a threshold amount of data awaiting transmission between the UE and the communication system.

12. A node configured for operation in a communication system, the node comprising:
input/output circuitry; and
processing circuitry operatively associated with the input/output circuitry and configured to:
receive, via the communication circuitry, first measurement information from a User Equipment (UE) being served via a first transceiver in the communication system, the first measurement information indicating measurements made by the UE on a first broadcast signal transmitted by the first transceiver and on a second broadcast signal transmitted by a neighboring, second transceiver in the communication system;

initiate transmission of a directional signal between the UE and the second transceiver, responsive at least to determining from the first measurement information that the second transceiver is a candidate for serving the UE;

receive second measurement information from the UE or the second transceiver, the second measurement information indicating measurements made on the directional signal; and control handover of the UE from the first transceiver to the second transceiver in dependence on the second measurement information.

13. The node of claim 12, wherein the node comprises a base station that includes or otherwise controls at least the first transceiver.

14. The node of claim 12, wherein the node comprises a base station that includes the first transceiver, and wherein the second transceiver is included in another base station neighboring the first base station.

15. The node of claim 12, wherein the processing circuitry is configured to initiate transmission of the directional signal between the UE and the second transceiver by initiating transmission of a beamformed reference signal between the UE and the second transceiver.

16. The node of claim 15, wherein the processing circuitry is configured to initiate transmission of the beamformed reference signal by the second transceiver to the UE, and to receive the second measurement information from the UE.

17. The node of claim 16, wherein the processing circuitry is configured to transmit configuration information to the UE, for use by the UE in configuring measurements on the beamformed reference signal.

18. The node of claim 15, wherein the processing circuitry is configured to initiate transmission of the beamformed reference signal by the UE to the second transceiver, and to receive the second measurement information from the second transceiver.

19. The node of claim 12, wherein the processing circuitry is configured to determine from the first measurement information that the second transceiver is a candidate for serving the UE, based on determining that a signal quality or strength of the second broadcast signal at the UE meets a defined threshold.

20. The node of claim 12, wherein the first broadcast signal and the second broadcast signal respectively cover a first broadcast coverage area and a second broadcast coverage area, and the directional signal covers a directional coverage area different than the second broadcast coverage area.

21. The node of claim 12, wherein the first broadcast signal and the second broadcast signal are a first common pilot signal transmitted by the first transceiver and a second common pilot signal transmitted by the second transceiver, respectively.

22. The node of claim 12, wherein the processing circuitry is configured to initiate transmission of the directional signal between the UE and the second transceiver, based on initiating the transmission responsive to determining from the first measurement information that the second transceiver is a candidate for serving the UE, in conjunction with determining that there is more than a threshold amount of data awaiting transmission between the UE and the communication system.

* * * * *